April 10, 1962     J. H. FAUNCE     3,028,820
RAILROAD CAR TRUCK
Filed Nov. 16, 1960
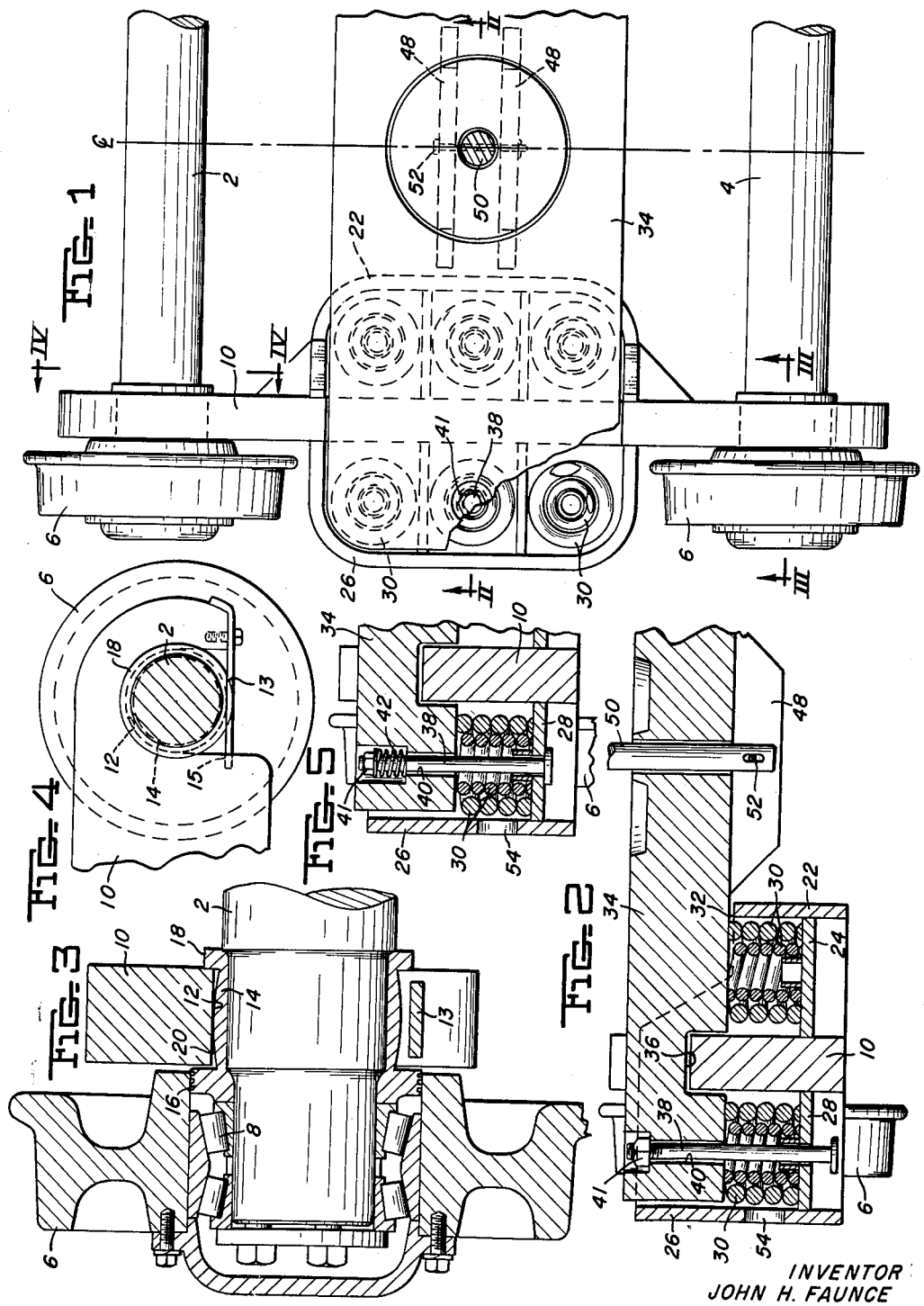
INVENTOR
JOHN H. FAUNCE
By Donald G. Dalton
Attorney

United States Patent Office 3,028,820
Patented Apr. 10, 1962

3,028,820
RAILROAD CAR TRUCK
John H. Faunce, Johnstown, Pa., assignor to United States Steel Corporation, a corporation of New Jersey
Filed Nov. 16, 1960, Ser. No. 69,632
2 Claims. (Cl. 105—197)

The present invention relates generally to railroad equipment and more particularly to an improved railroad car truck especially suitable for use in the construction of high weight capacity railroad cars such as those used to transport ingot molds in steel manufacturing plants.

One of the principal problems inherent in the transportation of ingot molds on ingot cars is the distribution of the weight of the load on the trucks of the car. It is essential that the load be distributed evenly on all the wheels of each truck. Car trucks built up to the time of my invention have been deficient in this respect in that they were not designed and constructed in such a manner as to impart sufficient flexibility to the truck structure so that the weight of the load placed thereon was immediately distributed evenly to all the wheels. This lack of flexibility in truck structure also rendered the trucks incapable of withstanding irregularities in the height of track over which the truck was to travel so that when one wheel of the truck encountered a depression or rise in the track an entire side or end of the truck was tilted.

As a result of such structural deficiencies ingot mold cars were difficult as well as dangerous to move along a trackway from one point to another. The ingot car body was frequently unbalanced due to the position of the load on the car and this would often cause overturning of the car body and trucks during movement of the car so that the safety of workmen in the area of the trackway was jeopardized.

It is, accordingly, the primary object of my invention to provide a truck of flexible structure for use with high weight capacity railroad cars in which the side sill plates are independent of each other and are mounted on the axles of the truck in a manner to render them capable of limited universal movement relative to the axles.

It is another object of my invention to provide a truck of the character described wherein the ends of the truck bolster rest directly on the springs in the spring baskets of the truck and are overlapped by the sides of the spring baskets.

This and other objects will become more apparent after referring to the following specification and attached drawings in which:

FIGURE 1 is a plan view with a portion cut away for clarity;
FIGURE 2 is a cross-sectional view taken on the line II—II of FIGURE 1;
FIGURE 3 is a cross-sectional view taken on the line III—III of FIGURE 1;
FIGURE 4 is a longitudinal sectional view taken on the line IV—IV of FIGURE 1; and
FIGURE 5 is a partial view similar to FIGURE 2 showing a modification.

Referring more particularly to the drawings reference numerals 2 and 4 designate the axles of the truck of the invention. The axles 2 and 4 are "dead" axles and each has a wheel 6 rotatably mounted on each end thereof by means of anti-friction bearings 8. A pair of spaced side sill plates 10 extends substantially normal to and straddle the axles 2 and 4 inwardly of the wheels 6. Each of the side sill plates 10 has an inverted U-shaped slot or opening 12 in its lower portion adjacent each end thereof which receives the axle on which the end of the sill plate rests. A retaining band 13 is detachably affixed to the underside of each sill plate 10 adjacent each end thereof and normally spans the open end of the inverted U-shaped slot 12 to confine the axles loosely within the slots. The free end of each retainer band fits into a longitudinal slot 15 in the sill plate, as best shown in FIGURE 4.

A sleeve 14, which functions as a wear ring and is preferably made of hardened steel, is rigidly mounted by shrink-fit on each axle immediately adjacent the inner side of each wheel 6. Each sleeve is provided with upstanding side flanges 16 and 18 and a crown or arcuate surface 20 extending between the side flanges. As best shown in FIGURE 3, the ends of the side sill plates rest on the crowns 20 of the sleeves. It will be noted that the crown 20 of each sleeve on which the side sill plate bears makes it possible for the sill plate to have a limited amount of universal movement thereby affording flexibility in the truck structure between the sill plates and the axles. The side flange 16 of each sleeve is disposed within the hub of the wheel adjacent thereof and functions as a grease retainer and dust collar for the wheel. Each side flange 18 is disposed adjacent the inner side of a sill plate to prevent lateral displacement of the sill plates. The axles may be rotated periodically to shift the bearing surfaces of the sleeves on which the side sill plates bear so as to effect even wear around the circumferences of the sleeves and prevent excessive wear in one spot.

A generally U-shape spring basket 22 having a bottom 24 and open top is rigidly affixed as by welding or similar means to the inner side of each of the sill plates 10. Similar spring baskets 26 having bottoms 28 and open tops are rigidly mounted to the outer side of each of the sill plates. The baskets 22 and 26 are mounted opposite each other on each of the sill plates intermediate the axles 2 and 4 and each contains three coil springs 30 disposed in upright position. The inner side 32 of each of the spring baskets 22 is cut away, as best shown in FIGURE 2, for a purpose which will become apparent.

A bolster 34 straddles the side sill plates 10 and extends substantially parallel with and intermediate the axles 2 and 4. The bolster is provided with a transverse slot 36 adjacent each end thereof for accommodating the side sill plates 10. The slots 36 are each slightly wider than the thickness of one of the side sill plates so that a loose connection is maintained between the bolster and the side sill plates. The ends of the bolster rest on the springs 30 in the baskets 22 and 26 and are secured by bolts 38 which project upwardly through holes in the bottoms of the spring baskets and extend through vertical holes 40 in the bolster. Each of the bolts is secured by a nut 41 which fits in a counterbored upper portion of each of the holes 40. If desired, each of the bolts 38 may be spring loaded by means of a helical spring 42 disposed around the portion of each bolt in the counterbored portions of the holes 40, as shown in FIGURE 5. This arrangement is desirable where there is a minimum of clearance between the bottom of the truck and the trackway. The springs 42 urge the bolts upwardly so that the head of each bolt always bears against the bottom of the basket and remains clear of the trackway. The bolts 38 and nuts 41 limit the vertical movement of the bolster to the extent of vertical movement of the springs 30 when they are under load and when they are under load and when they are free of load.

As best shown in FIGURES 1 and 2, the cut-away sides 32 of the inner baskets 22 and the transverse slots 36 on the underside of the bolster permit the ends of the bolster to lie within the baskets 22 and 26 resting on the springs 30 with the sides of the baskets overlapping the ends of the bolster. Thus, the sides of the spring baskets serve to guide the bolster in its movement. In such an overlapping arrangement the bolster also protects the springs in the spring baskets from the splash of molten metal and slag emanating from filled ingots being transported. The sides of the spring baskets also serve to align and stabilize the bolster in a horizontal plane along the transverse center line of the car. It will be noted that the portion of each sill plate below the slot 36 of the bolster may be notched to provide a loose interlocking fit between the bolster and the side sill plates.

Stiffener plates 48 may be provided on the bottom of the bolster extending parallel therewith intermediate and spaced from the baskets 22.

A king pin 50 projects upwardly through a vertical center hole in the bolster for connection with the car body (not shown) and has a portion projecting below the bottom of the bolster between the stiffener plates 48. A retainer key 52 extends through an opening in each of the stiffener plates and fits at right angles into the projecting bottom of the king pin to retain it in position. The arrangement wherein the retainer key passes through the stiffener plates prevents rotation of the king pin and insures that the retainer key will always remain in the same position relative to the longitudinal axis of the truck. This facilitates removal of the king pin when necessary.

One or more holes 54 may be provided in the sides of the baskets 26 for receiving the hooks of a lift crane when it is necessary to lift the truck.

In the embodiment of my invention illustrated I have shown three coil springs contained in each of the spring baskets, and the bolt 38 passing through the center spring in each basket. It will be noted that more or less than three springs may be used, as desired. by varying the size of the baskets and/or the springs. Where an even number of springs are used, the bolts 38 may extend upwardly intermediate the centrally located springs and where an odd number of springs are used the bolts may project upwardly through the center springs.

One of the important features of the truck of the invention which renders the truck a flexible rather than a rigid structure is the pair of spaced, independent side sill members which are capable of limited universal movement independent of bolster movement. This arrangement aids in equalizing forces on all truck elements. This flexibility of truck structure also makes it possible for the truck to automatically adjust itself to any uneven track condition for more uniform load distribution.

Another advantageous feature of the truck of the invention is its adaptability to various track gauges. The truck can be easily modified for use on a different gauge track by merely replacing the axles and bolster with axles and bolster of a length corresponding to the gauge track on which it is desired to use the truck.

While one embodiment of my invention has been shown and described it will be apparent that other adaptations and modifications may be made without departing from the scope of the following claims.

I claim:

1. A railroad car truck comprising a pair of stationary axles in spaced parallel relation, a wheel rotatably mounted on each of said axles on each end thereof, a pair of spaced side sill plates straddling said axles inwardly of said wheels, said side sill plates being disposed one immediately adjacent the wheels on each end of said pair of axles, each of said side sill plates having an inverted U-shaped slot extending upwardly from its lower edge adjacent the ends thereof, one of said axles fitting loosely in the slots adjacent each end of said plates, means loosely confining the axles in said slots, crown bearing surfaces on said axles subjacent said side sill plates, a bolster straddling said side sill plates intermediate said axles, said bolster having a slot on its underside adjacent each end thereof for loosely receiving said side sill plates, spring means on said side sill plates supporting said bolster, and means securing said bolster and said spring means together, said spring means including a basket affixed to each side of each of said side sill plates intermediate said axles, a plurality of coil springs disposed in upright positions in each of said baskets, the inner sides of the basket on the inner side of each of said side sill plates being cut away for receiving said bolster, and the other sides of said inner baskets and the sides of the baskets on the outer side of each of said side sill plates overlapping the ends of said bolster.

2. A railroad car truck as defined by claim 1 characterized by a stiffener plate disposed on the bottom of and extending parallel with said bolster intermediate the baskets on the inner sides of said side sill plates, the ends of said stiffener plate being spaced from said last named baskets, said bolster having a vertical center hole therethrough, a king pin disposed in said center hole with portions thereof projecting from the top and bottom of said bolster, a key fitted into the portion of said pin projecting from the bottom of said bolster and extending normal to the pin, said stiffener plate having a transverse hole therethrough adjacent said pin, said key projecting through the hole in said stiffener plate whereby rotation of said pin is restricted.

References Cited in the file of this patent

UNITED STATES PATENTS

| | | |
|---|---|---|
| 2,312,377 | Bauer | Mar. 5, 1943 |
| 2,386,577 | Statler et al. | Oct. 9, 1945 |
| 2,758,551 | Kreiner | Aug. 14, 1956 |